(12) United States Patent
Chang et al.

(10) Patent No.: US 7,785,734 B2
(45) Date of Patent: Aug. 31, 2010

(54) SECONDARY BATTERY HAVING AN IMPROVED SAFETY

(75) Inventors: Sung Kyun Chang, Daejeon (KR); Jae Hyun Lee, Daejeon (KR); Joon Hwan Lee, Daejeon (KR); Soo Hyun Ha, Busau (KR); Jeong Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 1300 days.

(21) Appl. No.: 11/247,881

(22) Filed: Oct. 10, 2005

(65) Prior Publication Data

US 2006/0083983 A1   Apr. 20, 2006

(30) Foreign Application Priority Data

Oct. 8, 2004   (KR) .............. 10-2004-0080304

(51) Int. Cl.
*H01M 2/00*   (2006.01)
*H01M 4/00*   (2006.01)
*H01M 6/12*   (2006.01)
*H01M 6/46*   (2006.01)

(52) U.S. Cl. ............... 429/122; 429/163; 429/164

(58) Field of Classification Search ........... 429/61, 429/94, 162, 7, 57, 59, 60, 66, 129, 161, 429/170, 306, 316, 160, 163, 164, 165, 166, 429/167, 168, 169, 152, 153, 155, 176, 178, 429/179, 49; 29/623.1, 623.2, 623.3, 623.4, 29/623.5
See application file for complete search history.

(56) References Cited

U.S. PATENT DOCUMENTS

| 4,869,978 | A | * | 9/1989 | Kubo et al. ............ 429/165 |
| 5,902,697 | A |   | 5/1999 | Guindy et al. |
| 6,054,233 | A |   | 4/2000 | Vourlis |

(Continued)

FOREIGN PATENT DOCUMENTS

EP   0384204   8/1990

(Continued)

OTHER PUBLICATIONS

International Search Report dated Jan. 12, 2006 for Application No. PCT/KR2005/003283 (All references cited in the Search Report are listed above).

(Continued)

*Primary Examiner*—Jennifer K Michener
*Assistant Examiner*—Eli S Mekhlin
(74) *Attorney, Agent, or Firm*—Cantor Colburn LLP

(57) ABSTRACT

Disclosed is a secondary battery. The secondary battery includes a battery can serving as a positive electrode terminal or a negative electrode terminal of the secondary battery, an electrically conductive substrate provided at an outer portion of the battery can, and a nonconductive film interposed between the battery can and the electrically conductive substrate in order to insulate the electrically conductive substrate from the battery can, wherein the electrically conductive substrate is electrically connected to an electrode terminal having polarity opposite to that of the battery can. Safety of the secondary battery is ensured even if the secondary battery is subject to external parameters, such as penetration of a sharp tool (e.g. a nail or a drill tip), pressing force of a tool (e.g. a nipper), external impact, and exposure to the high temperature.

11 Claims, 4 Drawing Sheets

U.S. PATENT DOCUMENTS

| | | | |
|---|---|---|---|
| 2001/0004503 A1* | 6/2001 | Kondo | 429/94 |
| 2003/0044677 A1* | 3/2003 | Naruoka | 429/161 |
| 2003/0118903 A1 | 6/2003 | Ogaku | |
| 2004/0096732 A1 | 5/2004 | Shin et al. | |

FOREIGN PATENT DOCUMENTS

| | | |
|---|---|---|
| JP | 08264206 | 10/1996 |
| JP | 2000048852 | 2/2000 |

OTHER PUBLICATIONS

Extended European Search Report for application No. 05856438.6-2119 dated Jul. 7, 2010.

* cited by examiner

SECONDARY BATTERY HAVING AN IMPROVED SAFETY

This application claims the benefit of the filing date of Korean Patent Application No. 2004-80304, filed on Oct. 8, 2004, in the Korean Intellectual Property Office, the disclosure of which is incorporated herein in its entirety by reference.

BACKGROUND OF THE INVENTION

1. Field of the Invention

The present invention relates to a secondary battery capable of improving the safety thereof and a safety device used for the same.

2. Description of the Prior Art

In general, secondary batteries are rechargeable batteries, which can be fabricated in a compact size or a large size. For instance, the secondary batteries include Ni-MH batteries, lithium batteries and lithium ion batteries. In addition, the secondary batteries are classified into cylindrical secondary batteries and square type secondary batteries according to the external appearances thereof.

Different from a pouch type secondary battery, the cylindrical secondary battery or the square type secondary battery includes a battery can serving as a positive electrode terminal or a negative electrode terminal and an electrode assembly accommodated in the battery can and including a positive electrode (cathode) coated with a positive electrode active material, a negative electrode (anode) coated with a negative electrode active material, and a separator interposed between the positive and negative electrodes.

Meanwhile, if a sharp tool, such as a nail or a drill tip, penetrates the positive and negative electrodes coated with active materials by passing through the battery can or if the battery can is pressed by means of a pressing tool, such as a nipper, an internal short circuit may occur between the positive and negative electrodes, so a great amount of current is applied between the positive and negative electrodes while generating heat. In an extreme case, the battery is subject to accidental ignition or explosion. For this reason, a safety device is provided in the battery in order to prevent the accidental ignition or explosion of the battery.

For instance, Japanese Patent Unexamined Publication No. 2000-48852 discloses a safety device for a secondary battery as shown in FIG. 1, wherein the safety device is provided at the outermost portion of an electrode assembly in the form of a jelly-roll, which is accommodated in a battery can of a cylindrical battery, by extending uncoated positive and negative electrodes, on which the active materials are not coated, by a predetermined length. The battery can is electrically insulated from the uncoated positive electrode or the uncoated negative electrode by means of a separator and the battery can may serve as a positive electrode terminal or a negative electrode terminal of the battery.

According to the above prior art, if the sharp tool penetrates the electrode assembly through the battery can, the short circuit occurs between the uncoated positive and negative electrodes having a relatively lower resistance, and also the short circuit occurs between the positive and negative electrodes having a relatively higher resistance, which are formed with active materials. At this time, short current may primarily flow between the uncoated positive and negative electrodes having a relatively lower resistance, so that an amount of current applied to the positive and negative electrodes having the active materials is reduced. Thus, the battery can be safely maintained even if the internal short circuit occurs in the battery, thereby preventing heat from being suddenly generated and the temperature from suddenly rising in the battery.

However, according to the above-mentioned conventional cylindrical battery, the short circuit may occur only when the sharp tool, such as a nail or a drill tip, penetrates the uncoated positive and negative electrodes after passing through the battery can, so that charged current in the battery can may not be rapidly discharged to the exterior while the sharp tool is penetrating into the battery can.

In addition, the uncoated positive and negative electrodes are aligned adjacent to the positive and negative electrodes coated with the active materials and the uncoated positive and negative electrodes have the thickness relatively smaller than that of the battery can. Thus, if the sharp tool introduced into the battery can any further moves toward the positive and negative electrodes coated with the active materials and penetrates the positive and negative electrodes, high-temperature heat may be suddenly generated in the battery can, so that the battery is subject to accidental ignition or explosion.

SUMMARY OF THE INVENTION

Accordingly, the present invention has been made to solve the above-mentioned problems occurring in the prior art, and an object of the present invention is to ensure the safety of a cylindrical battery or a square type battery from external parameters, such as penetration of a sharp tool (e.g. a nail or a drill tip), pressing force of a tool (e.g. a nipper), external impact, and exposure to the high temperature. In detail, the object of the present invention is to generate an external short circuit at the exterior of the battery can while the external parameters are being applied to the battery can, so that charged current in the secondary battery can be sufficiently discharged from the secondary battery before the external parameters exert a bad influence upon the secondary battery (e.g. an internal short circuit in an electrode assembly accommodated in the battery can). Thus, the safety of the secondary battery can be ensured even if an internal short circuit occurs between a positive electrode and a negative electrode of the secondary battery caused by the external parameters.

In order to accomplish the above object, the present invention provides a secondary battery comprising: a battery can serving as a positive electrode terminal or a negative electrode terminal of the secondary battery; an electrically conductive substrate provided at an outer portion of the battery can; and a nonconductive film interposed between the battery can and the electrically conductive substrate in order to insulate the electrically conductive substrate from the battery can, wherein the electrically conductive substrate is electrically connected to an electrode terminal having polarity opposite to that of the battery can.

According to the preferred embodiment of the present invention, the electrically conductive substrate is attached to an inner wall of a nonconductive hard casing, and the nonconductive hard casing surrounds at least a part of the secondary battery in a state in which a part of two electrode terminals is exposed to an exterior.

In addition, the present invention provides a safety device provided at an outer portion of a battery can serving as a positive electrode terminal or a negative electrode terminal of a secondary battery, wherein the safety device includes an electrically conductive substrate provided at one side thereof with a nonconductive film.

Figure 1:
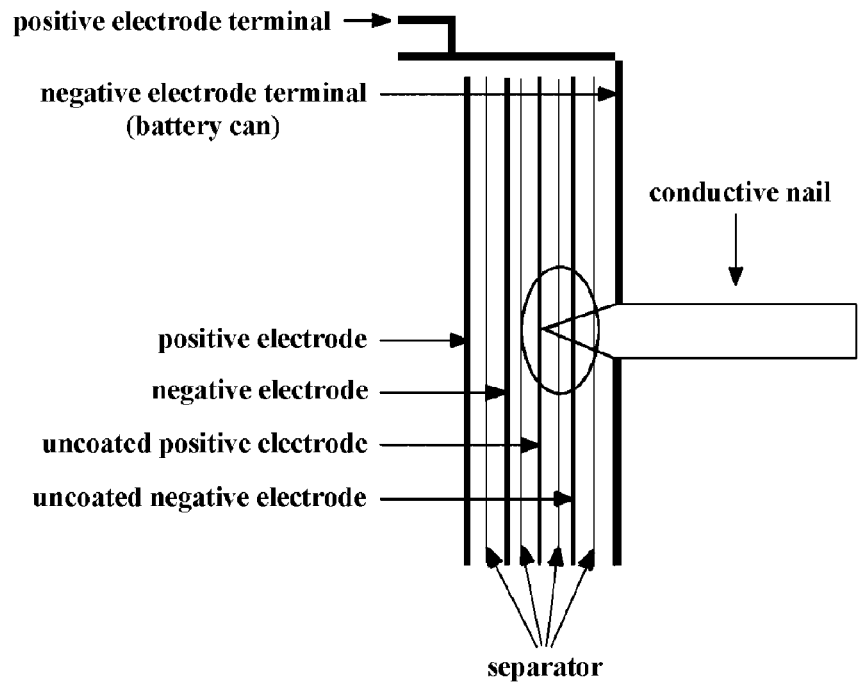
FIG. 1 is a partially schematic sectional view illustrating a conventional cylindrical battery.

In the drawings, drawing numeral 1 represents a safety device, 2a represents a nonconductive film, 2 represents an electrically conductive substrate and 3 represents a hard casing.

DETAILED DESCRIPTION OF THE PREFERRED EMBODIMENTS

Hereinafter, the present invention will be described in detail.

In a secondary battery using positive electrode active materials, such as lithium containing metal oxides capable of storing and discharging lithium and/or lithium ions, lithium is de-intercalated from the positive electrode active materials when the secondary battery is charged, so that the positive electrode active materials enter a thermally unstable state. In this state, if an internal short circuit occurs in the secondary battery caused by external parameters, such as penetration of a sharp tool, pressing force of a tool (e.g. a nipper), external impact, and exposure to the high temperature, the internal temperature of the secondary battery may rise. If the internal temperature of the secondary battery reaches a critical temperature, the structure of the positive electrode active materials remaining under the thermally unstable state may be broken, so that oxygen may be generated from the positive electrode active materials. Such oxygen may react with an electrolyte solvent while generating heat, so that exothermic reactions may consecutively occur in the secondary battery. Thus, the safety of the secondary battery cannot be ensured.

The present invention is characterized by generating an external short circuit at the exterior of a battery can while the external parameters are being applied to the battery can, so that charged current in the secondary battery can be sufficiently discharged from the secondary battery before the external parameters exert a bad influence upon the secondary battery (e.g. an internal short circuit in an electrode assembly accommodated in the battery can). Thus, the safety of the secondary battery can be ensured even if an internal short circuit occurs between a positive electrode and a negative electrode of the secondary battery caused by the external parameters. In order to generate the external short circuit at the exterior of the battery can, an electrically conductive substrate is installed at an outer portion of the battery can, which serves as a positive electrode terminal or a negative electrode terminal of the secondary battery, while interposing a nonconductive film therebetween, in such a manner that the electrically conductive substrate is electrically connected to an electrode terminal having polarity opposite to that of the battery can.

Figure 2:
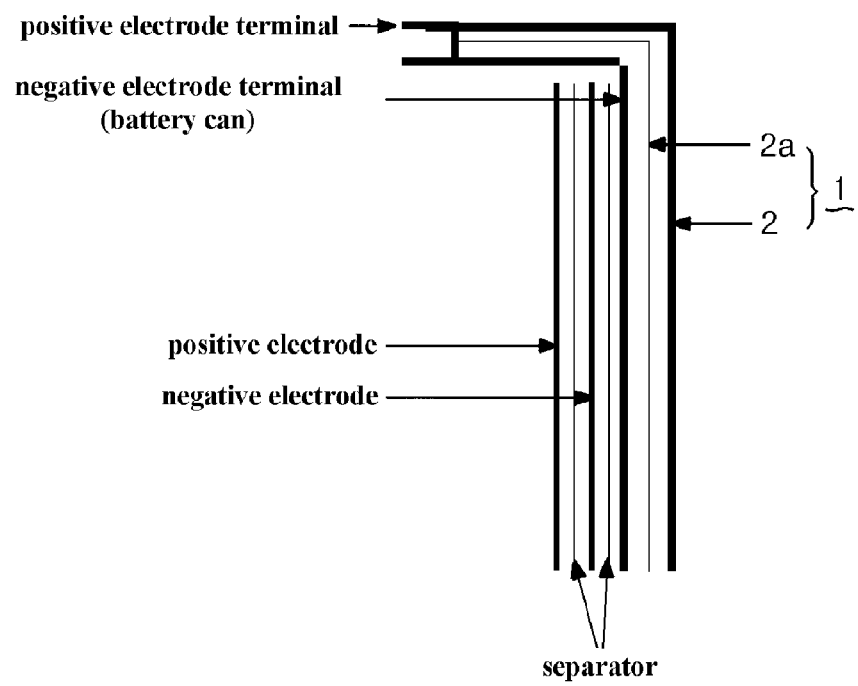
FIG. 2 is a partially schematic sectional view illustrating a secondary battery according to a first embodiment of the present invention.
Figure 3:
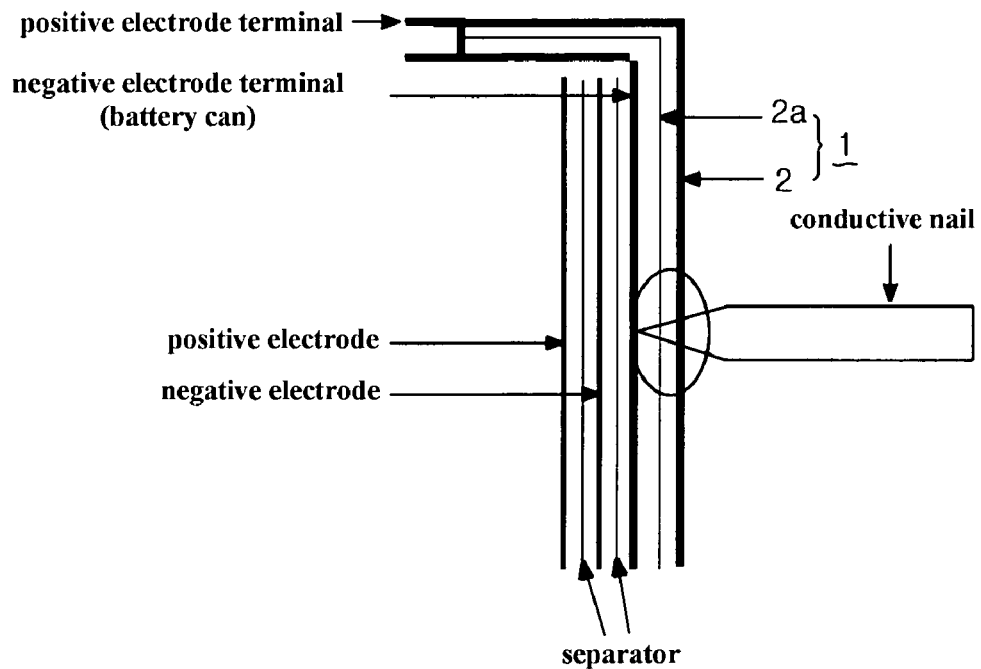
FIG. 3 is a partially schematic sectional view illustrating a secondary battery according to a first embodiment of the present invention, in which a nail partially penetrates into the secondary battery.

FIG. 2 is a partially schematic sectional view illustrating a secondary battery according to a first embodiment of the present invention and FIG. 3 is a partially schematic sectional view illustrating the secondary battery according to the first embodiment of the present invention, in which a nail partially penetrates into the secondary battery.

As shown in FIG. 2, a safety device 1 of the present invention includes an electrically conductive substrate 2 having a nonconductive film 2a at one side thereof. The safety device 1 is provided at an outer portion of a battery can serving as a positive electrode terminal or a negative electrode terminal of the secondary battery. At this time, a nonconductive wrapping member surrounding the battery can may be used as the nonconductive film forming a part of the safety device 1. Accordingly, the electrically conductive substrate 2 can be installed at the outer portion of the battery can in a state in which the nonconductive film is directly attached to the battery can, or the electrically conductive substrate 2 can be installed at the outer portion of the battery can in a state in which the nonconductive film is attached to one side of the electrically conductive substrate 2.

According to the secondary battery of the present invention, the safety device 1 is provided at the outer portion of the battery can, so that a short circuit occurs at the outer portion of the battery can when a nail or a drill tip penetrating the electrically conductive substrate 2 of the safety device 1 makes contact with the battery can. However, according to the conventional secondary battery, an uncoated positive electrode and an uncoated negative electrode serving as a safety device are provided in the battery can while interposing a separator therebetween, so the short circuit may not occur while the nail or the drill tip is penetrating into the battery can, but the short circuit may occur when the nail or the drill tip penetrates both the uncoated positive electrode and the uncoated negative electrode.

In addition, the battery can has a thickness of about 200 to 1000 $\mu m$, which is larger than that (10 to 20 $\mu m$) of a separator. Accordingly, when it is assumed that the nail or the drill tip penetrates into the secondary battery with the same penetration force in both the present invention and the prior art, the time interval of the present invention from an external short circuit between the battery can and the electrically conductive substrate of the safety device installed at the outer portion of the battery can to the internal short circuit between the positive electrode and the negative electrode coated with active materials and installed in the battery can while interposing the separator therebetween, that is "(thickness of battery can+ thickness of separator)/penetration speed" is significantly longer than the time interval of the prior art employing the uncoated positive/negative electrodes as a safety device, from the first short circuit between the uncoated positive electrode and the uncoated negative electrode to the second short circuit between the positive electrode and the negative electrode coated with the active materials, that is "thickness of separator/penetration speed". Therefore, in the secondary battery according to the present invention, the more charged current corresponding to the increase of the time interval can be discharged out of the secondary battery through the external short circuit, thereby changing the status of the secondary battery from the charge state to the discharge state, in which the positive electrode active materials remain in a stable state. Thus, in the secondary battery according to the present invention, even if the nail or the drill tip penetrate into the battery can, the separator, the positive electrode and the negative electrode and thus the internal short circuit occurs, heat is rarely generated in the secondary battery, thereby preventing accidental ignition or explosion of the secondary battery (see, FIG. 3).

Meanwhile, in a normal state of the secondary battery in which the nail or the drill tip does not penetrate into the secondary battery, the same voltage is applied to the electrically conductive substrate 2 and the electrode terminal connected to the electrically conductive substrate 2, so that current does not flow between the electrically conductive substrate 2 and the electrode terminal even if a terminal of an electronic appliance (not shown) or a conductive member makes contact with the positive and negative electrode terminals of the secondary battery (see, FIG. 2).

In addition, it is preferred if the nonconductive film 2a is melted under a predetermined temperature. In this case, when the internal temperature of the secondary battery rises by exposure to the high temperature, the nonconductive film 2a is melted prior to explosion of the secondary battery, thereby causing the external short circuit between the electrically conductive substrate 2 and the battery can in the same manner as when the nail or the drill tip penetrates into the secondary battery from the exterior of the secondary battery.

Preferably, the melting point of the nonconductive film 2a is about 100 to 200° C.

The nonconductive film 2a is made from polyolefin-based resin, such as polyethylene, polypropylene or copolymer thereof.

It is preferred if the electrically conductive substrate 2 has superior heat conductivity and heat-resistant characteristics.

The electrically conductive substrate 2 can be made from metals having electric conductivity or alloys thereof. Preferably, the electrically conductive substrate 2 is made from at least one selected from the group consisting of Al, Cu, Ni, Sn, stainless steel and carbon sheet having superior electric conductivity and heat conductivity.

The electrically conductive substrate 2 is preferably fabricated in the form of a long strip having a predetermined thickness. In addition, the electrically conductive substrate 2 preferably surrounds the secondary battery except for a part of the positive electrode terminal and the negative electrode terminal, in such a manner that the charged current in the secondary battery can be sufficiently introduced into the electrically conductive substrate 2 provided at the outer portion of the battery can for preventing heat from being generated in the secondary battery when the nail or the drill tip penetrates into the secondary battery.

In addition, a polymer resin layer (not shown) can be provided at an outer portion of the electrically conductive substrate 2 such that the electrically conductive substrate 2 does not electrically make contact with external devices. Preferably, the polymer resin layer is made from PET (Polyethylene Terephthalate) or nylon-based materials in order to protect the battery can while allowing predetermined printing work.

Figure 8:
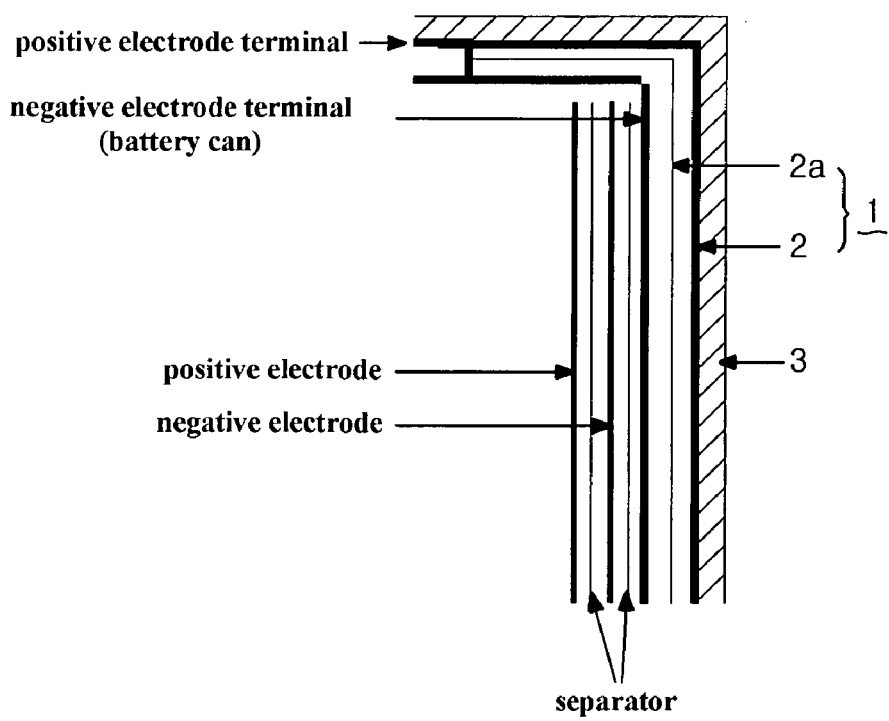
FIG. 8 is a partially schematic sectional view illustrating a secondary battery according to a second embodiment of the present invention.

Meanwhile, a secondary battery according to a second embodiment of the present invention includes a nonconductive hard casing 3 and an electrically conductive substrate 2 attached to an inner wall of the nonconductive hard casing 3. The nonconductive hard casing 3 surrounds at least a part of the secondary battery in a state in which a part of two electrode terminals is exposed to the exterior. In addition, the electrically conductive substrate 2 is insulated from the battery can of the secondary battery by means of a nonconductive film 2a and is electrically connected to an electrode terminal having polarity opposite to that of the battery can (see, FIG. 8).

Thus, since the nonconductive hard casing is provided at the outer portion of the secondary battery, the secondary battery according to the second embodiment of the present invention can be more safely protected from sharp tools.

The secondary battery according to the second embodiment of the present invention is substantially similar to the secondary battery according the first embodiment of the present invention, except that the hard casing, which is provided at the inner wall thereof with the electrically conductive substrate, is installed at the outer portion of the battery can serving as the positive electrode terminal or the negative electrode terminal of the secondary battery. Thus, the description related to the operation and structure of the same or similar elements will be omitted below in order to avoid redundancy.

In addition, according to the second embodiment of the present invention, a plurality of secondary batteries can be provided in the hard casing in the form of a battery pack so as to simplify the manufacturing process. If plural secondary batteries are accommodated in one hard casing, heat can be uniformly distributed to the peripheral area or exterior through the electrically conductive substrate attached to the inner wall of the hard casing, even if each of the secondary batteries irregularly generates heat. For instance, it is preferred when considering the safety of the secondary battery pack if the temperatures of six batteries rise from 40 to 50° C., respectively, as compared with when the temperature of one battery rises from 40 to 100° C.

The secondary battery according to the present invention can be fabricated in the form of a cylindrical battery, a square type battery or other types of batteries if the battery can of the secondary battery may serve as the negative electrode terminal or the positive electrode terminal.

The following example is for explaining the safety of the secondary battery according to the present invention in detail. However, the following example is for illustrative purposes only, and is not intended to limit the scope of the present invention.

EXAMPLE

Example 1

A battery can was made from a metal having a diameter of 65 mm and a height of 18 mm. Then, a secondary battery having a capacity of 2200 mAh was prepared with a positive electrode active material ($LiCoO_2$), a negative electrode active material (carbon), a separator (polymer), and an electrolyte (organic solvent: EC and EMC). At this time, the battery can served as a negative electrode terminal and a metallic thin film including a nonconductive film and being made from aluminum was attached to the outer portion of the battery can, in such a manner that the metallic thin film was electrically insulated from the battery can and a part of the metallic thin film was connected to a positive electrode terminal (see, FIG. 2).

Figure 4:
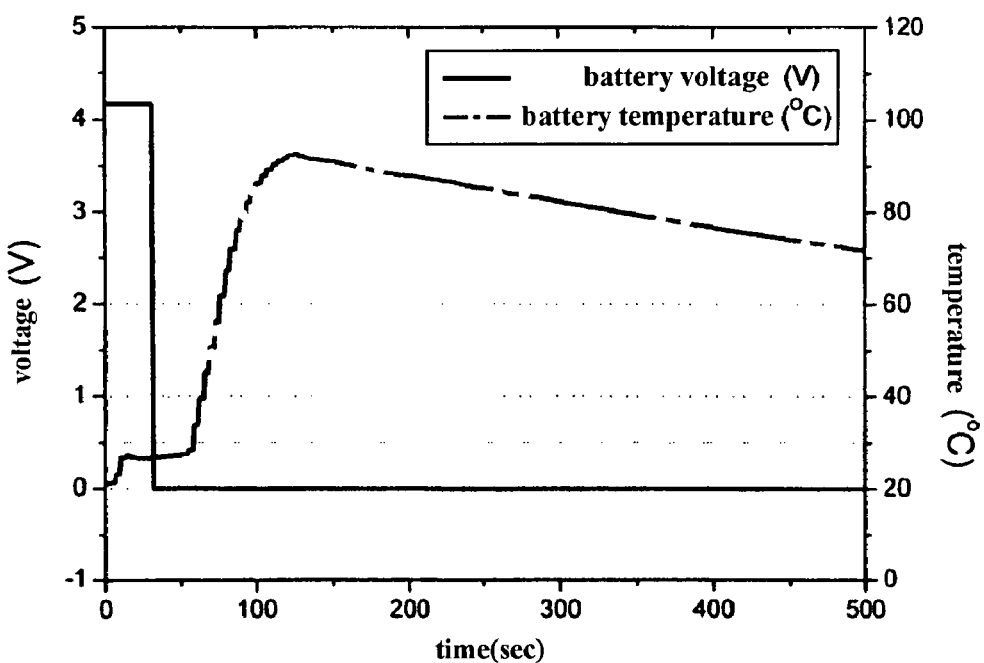
FIG. 4 is a graph illustrating temperature and voltage variation of a secondary battery as a function of time when the secondary battery according to a first example of the present invention has been charged with 4.2V and a nail having a diameter of 2 mm completely penetrates the secondary battery.
Figure 6:
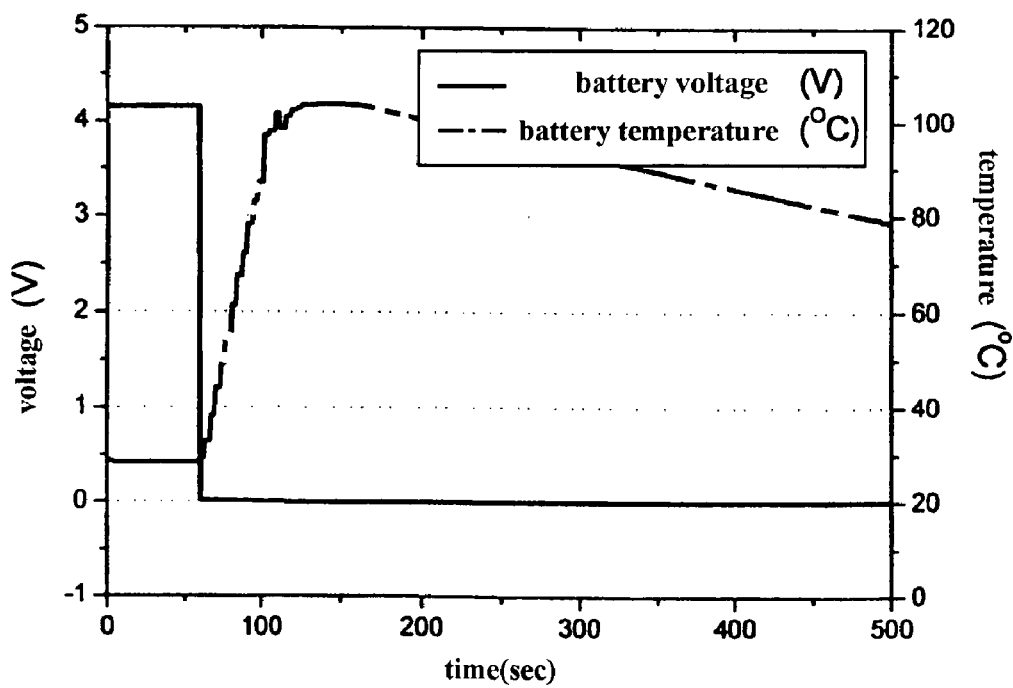
FIG. 6 is a graph illustrating temperature and voltage variation of a secondary battery as a function of time when the secondary battery according to a first example of the present invention has been charged with 4.2V and a nail having a diameter of 2 mm partially penetrates into a battery can from an exterior by a distance of 8 mm.
Figure 7:
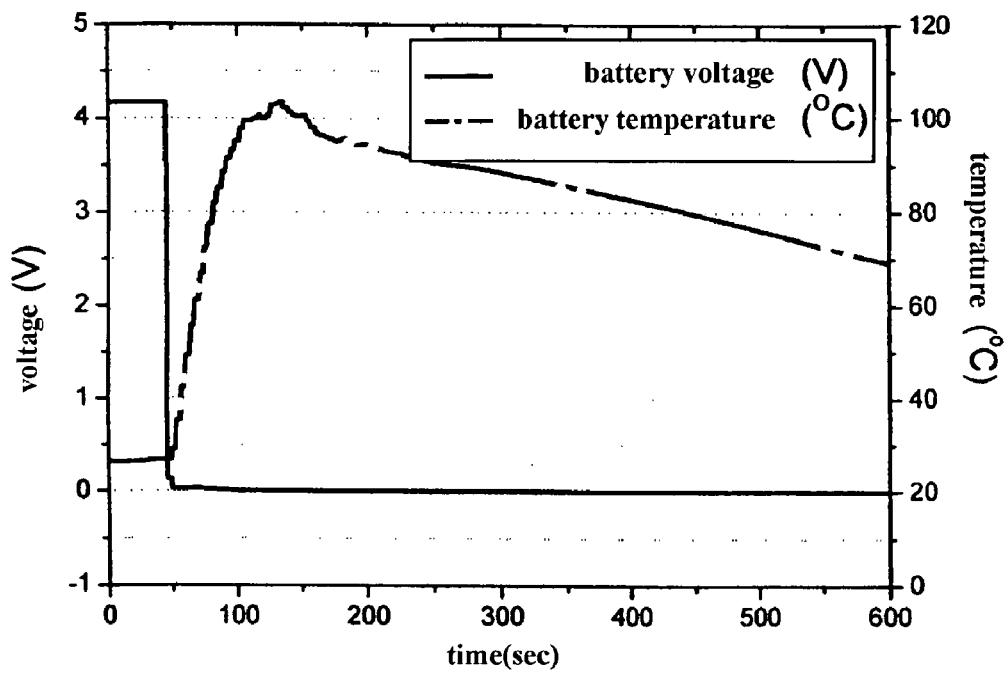
FIG. 7 is a graph illustrating temperature and voltage variation of a secondary battery as a function of time when the secondary battery according to a first example of the present invention has been charged with 4.2V and a nail having a diameter of 2 mm partially penetrates into a battery can from an exterior by a distance of 4 mm.

After that, in a state in which the secondary battery having the above structure was charged with 4.2V, the voltage and the temperature of the secondary battery were measured while allowing a nail having a diameter of 2 mm to completely penetrate the secondary battery at a speed of 1000 mm/min. The result is shown in FIG. 4. In addition, in a state in which the secondary battery was charged with 4.2V, the voltage and the temperature of the secondary battery were measured while allowing a nail having a diameter of 2 mm to partially penetrate into the secondary battery from an exterior by a distance of 8 mm and 4 mm at a speed of 1000 mm/min, respectively. The results are shown in FIGS. 6 and 7, respectively.

If the nail partially penetrates into the secondary battery, heat is concentrated onto one spot of the secondary battery, so it is more dangerous as compared with when the nail completely penetrates the secondary battery. However, as shown in FIGS. 6 and 7, safety of the secondary battery fabricated according to the present invention was ensured even if the nail partially penetrated into the secondary battery.

Comparative Example 1

A battery can was made from a metal having a diameter of 65 mm and a height of 18 mm. Then, a secondary battery having a capacity of 2200 mAh was prepared with a positive electrode active material ($LiCoO_2$), a negative electrode active material (carbon), a separator (polymer), and an electrolyte (organic solvent: EC and EMC). After that, an uncoated positive electrode made from aluminum and an uncoated negative electrode made from copper were wound around the outermost part of a jelly-roll type electrode assembly while interposing a separator between the uncoated positive electrode and the uncoated negative electrode, and the jelly-roll type electrode assembly was accommodated in the battery can (see, FIG. 1).

Figure 5:
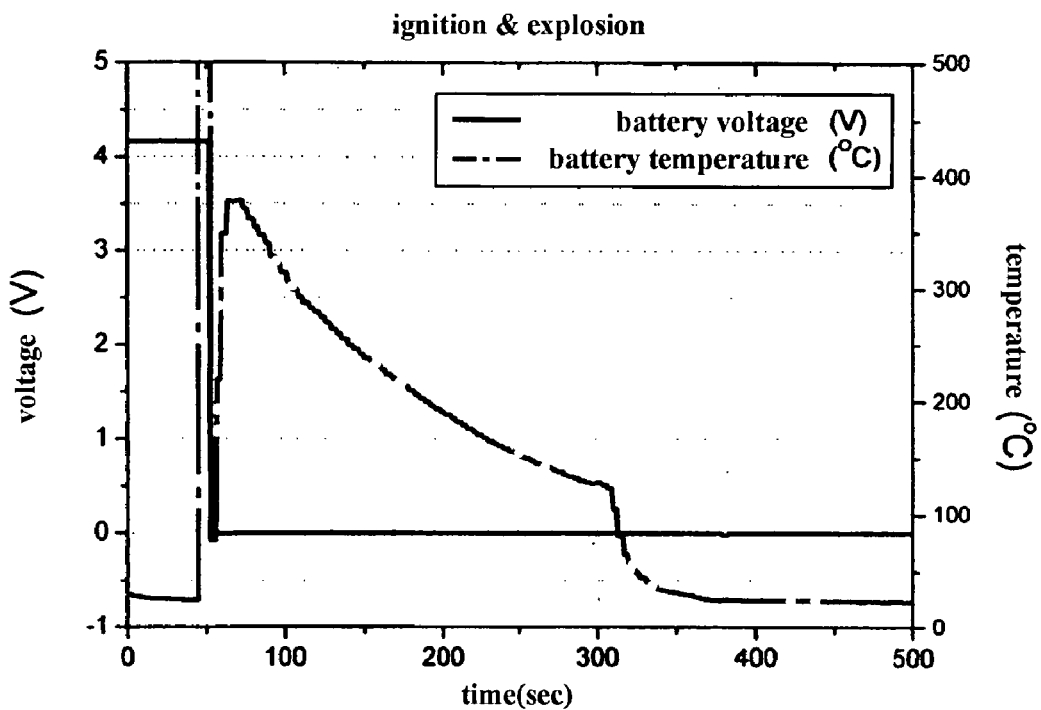
FIG. 5 is a graph illustrating temperature and voltage variation of a conventional cylindrical battery as a function of time when the conventional cylindrical battery has been charged with 4.2V and a nail having a diameter of 2 mm completely penetrates the conventional cylindrical battery.

Then, in a state in which the secondary battery having the above structure was charged with 4.2V, the voltage and the temperature of the secondary battery were measured while allowing a nail having a diameter of 2 mm to completely penetrate the secondary battery at a speed of 1000 mm/min. In this case, accidental ignition or explosion of the secondary battery occurred (see, FIG. 5).

As described above, the present invention can ensure safety of the secondary battery even if the secondary battery is subject to external parameters, such as penetration of a sharp tool (e.g. a nail or a drill tip), pressing force of a tool (e.g. a nipper), external impact, and exposure to the high temperature.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
    a battery can serving as a positive electrode terminal or a negative electrode terminal of the secondary battery;
    an electrically conductive substrate provided at an outer portion of the battery can; and
    a nonconductive film interposed between the battery can and the electrically conductive substrate in order to insulate the electrically conductive substrate from the battery can, wherein the electrically conductive substrate is electrically connected to an electrode terminal having polarity opposite to that of the battery can, and the electrically conductive substrate surrounds the battery can, except for a part of the positive and negative electrode terminals of the secondary battery.

2. The secondary battery as claimed in claim 1, wherein the electrically conductive substrate is attached to an inner wall of a nonconductive hard casing, and the nonconductive hard casing surrounds at least a part of the secondary battery in a state in which a part of two electrode terminals is exposed to an exterior.

3. The secondary battery as claimed in claim 2, wherein the electrically conductive substrate is made from at least one selected from the group consisting of Al, Cu, Ni, Sn, stainless steel and carbon.

4. The secondary battery as claimed in claim 2, wherein the nonconductive film, which insulates the battery can from the electrically conductive substrate, is melted under a predetermined temperature.

5. The secondary battery as claimed in claim 1, wherein the electrically conductive substrate has heat conductivity.

6. The secondary battery as claimed in claim 2, wherein the electrically conductive substrate has heat conductivity.

7. The secondary battery as claimed in claim 1, wherein the electrically conductive substrate is made from at least one selected from the group consisting of Al, Cu, Ni, Sn, stainless steel and carbon.

8. The secondary battery as claimed in claim 1, wherein a polymer resin layer is provided at an outer portion of the electrically conductive substrate such that the electrically conductive substrate does not electrically make contact with external devices.

9. The secondary battery as claimed in claim 1, wherein the nonconductive film, which insulates the battery can from the electrically conductive substrate, is melted under a predetermined temperature.

10. A safety device provided at an outer portion of a battery can serving as a positive electrode terminal or a negative electrode terminal of a secondary battery, wherein the safety device includes an electrically conductive substrate provided at one side thereof with a nonconductive film, wherein the electrically conductive substrate surrounds the battery can, except for a part of the positive and negative electrode terminals of the secondary battery.

11. The safety device as claimed in claim 10, wherein the electrically conductive substrate is made from at least one selected from the group consisting of Al, Cu, Ni, Sn, stainless steel and carbon.

* * * * *